INVENTOR
ROBERT B. HOLDEN

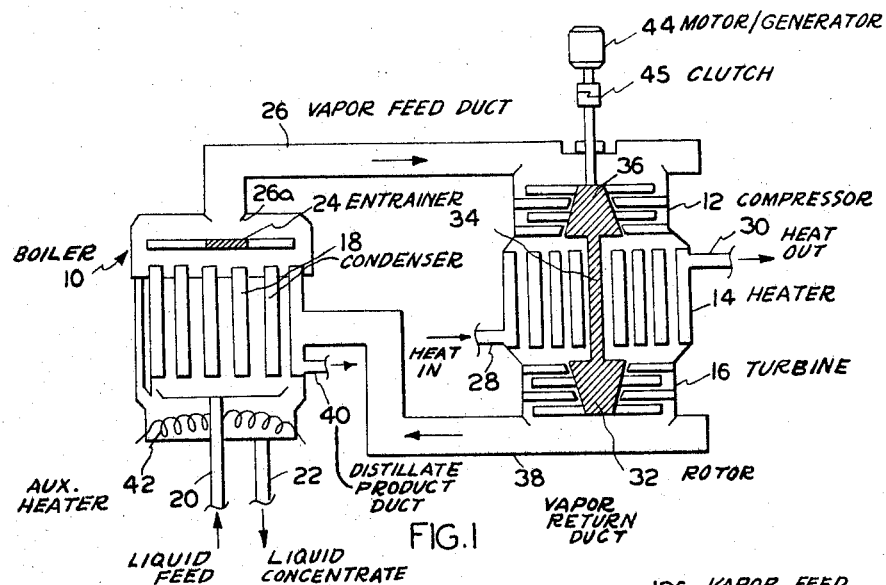
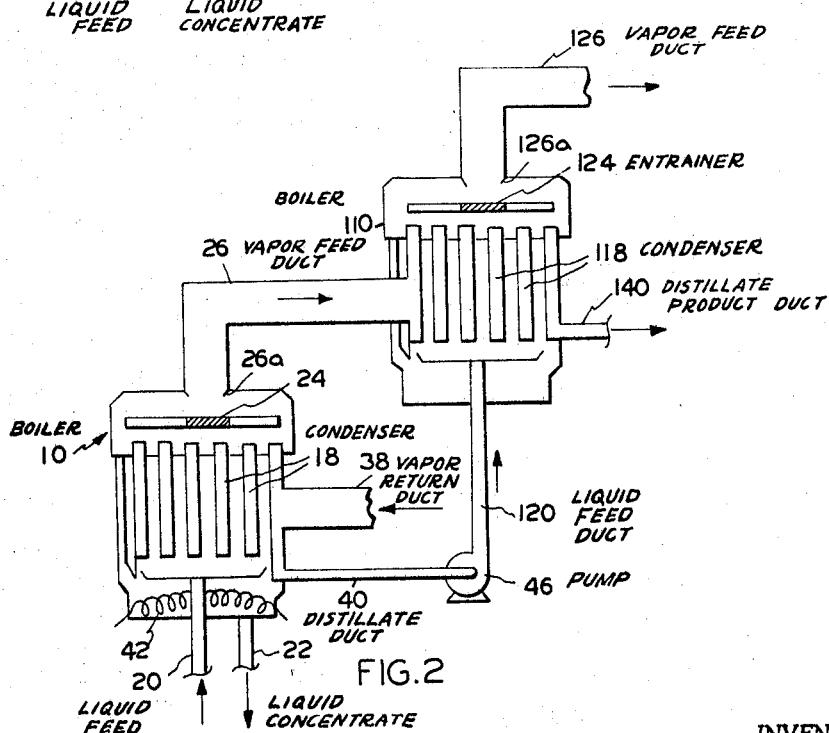

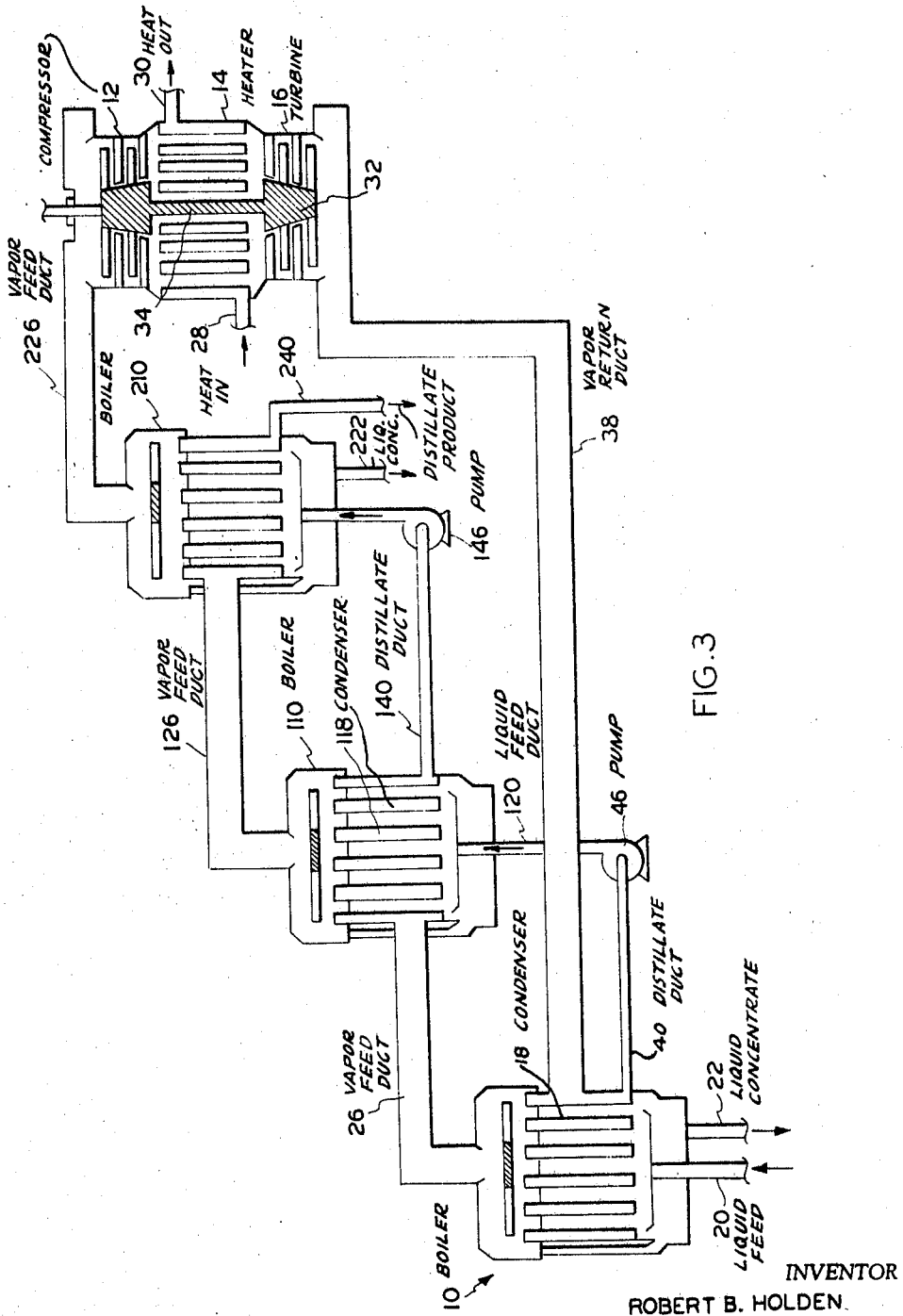

BY Steward & Steward

ATTORNEYS

INVENTOR
ROBERT B. HOLDEN

BY Steward & Steward
ATTORNEYS

United States Patent Office 3,423,293
Patented Jan. 21, 1969

3,423,293
APPARATUS FOR VAPOR COMPRESSION
DISTILLATION OF IMPURE WATER
Robert B. Holden, 355 Fairlea Road,
Orange, Conn. 06477
Filed Feb. 4, 1965, Ser. No. 430,324
U.S. Cl. 202—172                    11 Claims
Int. Cl. B01d 3/00

ABSTRACT OF THE DISCLOSURE

Apparatus for distilling pure water from an impure source, comprising a boiler, having an integral condenser section in direct heat transfer relation to impure water introduced into the boiler, a compressor adiabatically compressing vapor produced in the boiler, a superheater for the compressed vapor, an expander in which the compressed vapor is expanded under isobaric conditions to provide energy for driving the compressor, with the expanded vapor being returned to the condenser of the boiler for condensation therein in direct heat transfer relation to the impure water. Upon release of both the superheat and latent heat of the returned vapor in the boiler condenser section, a slightly greater mass of fresh steam than the mass of vapor returned is produced from the impure water, resulting in substantial improvement in distillation efficiency obtained and/or reduction and simplication of equipment in comparison with the conventional simple or multiple effect distillation systems.

---

This invention relates to a thermomechanical system, and more particularly to one incorporating a fluid evaporator, such as a boiler, in combination with a turbo compressor in a novel and unique manner to effect practically useful results.

To this end it is a principal object of this invention to provide an economical means for separating pure water from salt or brackish water, wherein only thermal energy is required to effect the separation. Although the purification of water is probably the largest single application of the system now contemplated, it will be understood that the principles of the system herein disclosed are also applicable for separating other evaporatable fluids from nonvolatile or less-volatile substances.

A still further object is to provide optimum means for using thermal energy concurrently to produce electrical energy and pure water in any desired ratio. These and other objects of the invention will become apparent as the following description proceeds.

A number of methods are available for obtaining fresh water from saline water. Simple distillation is effective, of course, but the thermal energy required to produce a unit quantity of water is the heat of vaporization of water. Since the heat of vaporization of water is large, approximately 7.7 million B.t.u. per 1000 gallons of liquid water under ordinarily conditions, the cost of the heat required makes simple distillation unattractive for many large scale applications. This thermal energy input per unit quantity of water can be reduced by a factor of approximately two by using double effect evaporation, and reduced approximately three-fold by using triple effect evaporation. However, in multiple effect distillation, each stage must operate at a substantially lower pressure than the preceding stage, so the practical number of stages which can be used is limited. There are a number of other separative processes which utilize electrical or mechanical energy, but these suffer from the fact that energy in these forms is much more costly than is energy in the form of heat.

The present invention involves a thermomechanical system which employs only thermal energy to effect distillation or separation, but accomplishes this at a thermal energy input which is only a small fraction of that required for ordinary distillation. The application of the system is illustrated by the accompanying sketches, in which FIG. 1 illustrates diagrammatically a single opencycle system incorporating a boiler and turbo compressor with intermediate heater for the production of distilled water from sea water;

FIG. 2 is similarly a diagrammatic illustration of the boiler arrangement in a closed-loop system, wherein the vapor passing through the turbo compressor unit (omitted here for purposes of simplification of the illustration) is condensed and continuously recirculated;

FIG. 3 illustrates a complete three-tandem boiler arrangement;

Figure 4:
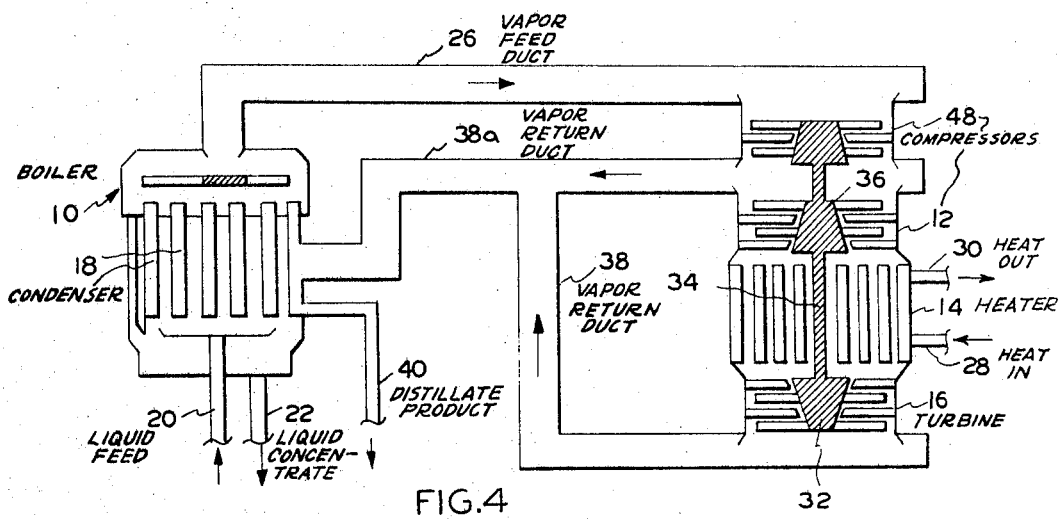
FIG. 4 illustrates a further modification incorporating a two-compressor system using a single boiler.

Referring first to FIG. 1 for an understanding of the basic form of the system, the system illustrated schematically includes a multiple tube boiler 10 for producing steam from saline water, a compressor 12 wherein the steam is compressed approximately adiabatically, a heater 14 in which the compressed steam is superheated by means of externally supplied thermal energy, a turbine 16 through which the superheated steam then expands, and finally a multiple tube condenser section 18 in boiler 10 where the steam is recondensed, releasing both its superheat and its latent heat to produce a slightly greater quantity (mass) of fresh steam from the saline feed water.

The saline boiler feed water is introduced to boiler 10 at inlet duct 20 and is removed in slightly concentrated form at outlet duct 22. The vapor from the water evaporated in the boiler passes upwardly through a vaned separator 24 to remove entrained droplets, and then to the throat of the compressor through duct 26. Compressor 12 compresses the vapor adiabatically, as mentioned above, and passes it through heat exchanger 14. This is supplied with external thermal energy, as for example combustion gases or other heat-bearing fluids, entering through input duct 28 and exiting at outlet 30 of heater section 14. In steady-state operation, the sole energy input to the system is heat supplied to exchanger 14. The superheated water vapor upon leaving heat exchanger 14 passes through turbine 16 producing rotation of turbine rotor 32. This is mechanically connected by a shaft 34 directly to the rotor 36 of the compressor section 12, thereby driving the compressor. Vapor exiting from turbine 16 enters return duct 38 by which it is delivered to the condenser section 18 of boiler 10. The condensed vapor then is discharged as distilled water at outlet 40 in the lower portion of the condenser section of the boiler. Preferably the boiler feed water entering through duct 20 has been preheated by passage through another heat exchanger (not shown) where it removes heat from both the distillate emerging at duct 40 and the concentrated saline water exiting from duct 22.

In order to start this system, an auxiliary start-up heater 42 in boiler 10 is supplied with external heat to bring the boiler initially to the operating temperature range. Also an auxiliary start-up device 44, as for example an electric motor, is used to bring the compressor-turbine system to operating speed. After start-up, the supply of heat to auxiliary heater 42 is turned off and start-up motor 44 is uncoupled by a clutch 45 from the compressor turbine, and the motor shut down. The system then continues steady-state operation using only the heat supplied to heat exchanger 14 between the compressor and turbine sections. Start-up of the system may also be effected by using the start-up motor 44 alone, but a longer time is required to reach steady-state operation in such case.

In order for the system to operate, it is essential that the turbine exit pressure be greater than the pressure at which steam is produced in the boiler and also be slightly greater than the saturation pressure at the boiler operating temperature. If this condition were not met, the steam emerging from the turbine would not condense in the boiler heat exchanger and no fresh steam would be generated. In this example, the compressor is mounted on the same shaft as the turbine and is driven by it. The amount of thermal energy supplied to the steam by the heater must be such that the work done on the turbine by the steam be equal to the work done on the incoming steam by the turbine.

The practical advantages of the invention will be better understood by examining the steps of the process involved in the foregoing simplified example of FIG. 1. In steady-state operation these steps are as follows:

*Step 1—Compression.*—Vapor emerging from the boiler section at pressure $P_1$ and absolute temperature $T_1$ is compressed adiabatically to $P_2$. This causes the temperature to increase to $T_2$. In this step $T_1$ goes to $T_2$, $P_1$ goes to $P_2$, $V_1$ goes to $V_2$.

*Step 2—Isobaric heating.*—At substantially constant pressure, $P_2$, the compressed vapor is passed through a heat exchange section from which it absorbs an amount of heat $q$, heating it to $T_3$. In this step $T_2$ goes to $T_3$, $P_2$ is unchanged ($P_2 = P_3$), $V_2$ goes to $V_3$.

*Step 3—Expansion.*—The heated vapor is passed through turbine section, where it expands adiabatically to pressure $P_4$, causing the temperature to fall to $T_4$. In this step $T_3$ goes to $T_4$, $P_2 = P_3$ goes to $P_4$, $V_3$ goes to $V_4$.

As already mentioned, compressor 12 and turbine 16 are mechanically linked as by shaft 34 to which both are keyed, and the design is so worked out in the illustrated system that the net work done by the system is zero, i.e., the work done by the compressor is exactly equal to the work received by the turbine. Expressed symbolically, this means that $W_1 + W_2 + W_3 = 0$ where $W_1$, $W_2$ and $W_3$ are the work done by the mechanical system steps 1, 2 and 3 above, respectively. Since no work is done in the isobaric heating step, $W_2 = 0$, and the zero work constraint reduces to $W_1 + W_3 = 0$.

A second constraint imposed on the design of this system is that the pressure at which the vapor emerges from the turbine is equal to the saturation pressure of the distillate at the temperature at which it emerges from the boiler, $T_1$. This is necessary to effect condensation of the vapor in the boiler heat exchanger. If, for example, sea water having a normal boiling point of 100.8° C. is being distilled at exactly 1.00 atmosphere, then the steam emerging from step 3 must have a pressure at least equal to the saturation pressure of steam at 100.8° C., or about 1.029 atmospheres, or it will not condense in the boiler heat exchanger. This is expressed symbolically as $$P_4 = \alpha P_1$$

where $$\alpha = \frac{\text{saturation pressure at } T_1}{P_1}$$

The sole energy input to the process is the heat $q$ delivered to the compressed steam in step 2. For convenience in analysis, the term "thermal cost" will be introduced, defined simply as the ratio of the actual heat required to produce a unit quantity of distillate to that heat required to produce it by simple distillation. Expressed in symbols, $$\text{Thermal cost} = \vartheta = \frac{q}{L} = \frac{1}{L} \int_{T_2}^{T_3} C_p dT$$

where L is the heat of vaporization and $C_p$ is the heat capacity of the vapor (steam) at constant pressure. To the approximation that the heat capacity is independent of temperature $$\vartheta = \frac{q}{L} = \frac{C_p}{L}(T_3 - T_2) \qquad (1)$$

This thermal cost can be evaluated using the constraint $W_1 + W_3 = 0$ and $P_4 = \alpha P_1$, and the approximation that the vapor obeys the ideal gas law, $PV = RT$, where R is the gas law constant. This is done as follows:

$$W_1 = P_2V_2 - P_1V_1 + \int_{V_1}^{V_2} P(dV) = P_2V_2 - P_1V_1 + C_v(T_2 - T_1)$$

$$W_2 = 0$$

$$W_3 = P_4V_4 - P_3V_3 + \int_{V_3}^{V_4} PdV = P_4V_4 - P_3V_3 + C_v(T_4 - T_3)$$

$$W_1 + W_3 = 0$$
$$= R(T_2 - T_1) + C_v(T_2 - T_1) + R(T_4 - T_3) + C_v(T_4 - T_3)$$
$$= C_p(T_1 - T_2 + T_3 - T_4)$$

Hence $$T_2 - T_1 = T_3 - T_4 \qquad (2)$$

From the ideal gas law applied to adiabatic compression $$T_2 = T_1 \left(\frac{P_2}{P_1}\right)^{\frac{r-1}{r}}$$

and $$T_4 = T_3 \left(\frac{P_4}{P_2}\right)^{\frac{r-1}{r}} = T_3 \left(\frac{\alpha P_1}{P_2}\right)^{\frac{r-1}{r}} \qquad (3)$$

where $r$ represents $C_p/C_v$, the ratio of the heat capacities of the vapor at constant pressure and constant volume. Substituting (3) into (2)

$$T_1\left\{\left(\frac{P_2}{P_1}\right)^{\frac{r-1}{r}} - 1\right\} = T_3\left\{1 - \alpha^{\frac{r-1}{r}}\right\}^{\frac{r-1}{r}}$$

so that $$T_3 = T_1 \frac{\left(\frac{P_2}{P_1}\right)^{\frac{r-1}{r}}}{1 - \alpha^{\frac{r-1}{r}} \cdot \left(\frac{P_1}{P_2}\right)^{\frac{r-1}{r}}} \qquad (4)$$

Setting $$\frac{P_2}{P_1} = x, \quad \frac{r-1}{r} = b, \quad \alpha^{\frac{r-1}{r}} = a$$

expression (4) becomes $$T_3 = T_1 \frac{x^b - 1}{1 - ax^{-b}} = T_1 x^b \cdot \frac{x^b - 1}{x^b - a} \qquad (5)$$

Then $$T_3 - T_2 = T_1 x^b \cdot \frac{x^b - 1}{x^b - a} - T_1 x^b$$

$$= T_1 x^b \left\{\frac{x^b - 1 - x^b + a}{x^b - a}\right\}$$

$$= T_1 x^b \frac{a - 1}{x^b - a} \qquad (6)$$

Hence, substituting (6) into expression (1) which defines thermal cost, $$\vartheta = \frac{C_p}{L} T_1 \frac{x^b(a-1)}{x^b - a} \qquad (7)$$

Equation 7 is the basic equation giving the thermal cost as function of the boiler temperature $T_1$ and the compression ratio $P_2/P_1$ employed in the compressor stage. As is apparent from its derivation, it assumes the applicability of the ideal gas laws, and neglects the frictional losses which will be present in a real system.

An example of the use of this equation for calculating the thermal cost for producing fresh water from sea water by means of this invention is as follows. Consider sea water having a normal boiling point of 100.8° C. distilled at a boiler pressure of 1 atmosphere, and compressed in the compression step to 17 atmospheres.

$T_1$=boiler temperature=100.8+273=374° K.
$P_1$=boiler pressure=1 atmosphere
$P_2$=compressor discharge pressure=17 atmospheres (250 p.s.i.a.)
=saturation pressure of water at 100.8° C.=1.029 atmospheres.

The physical constants of water are
$r$=1.324

$$b=\frac{r-1}{r}=0.2445$$

$C_p$=0.482 cal./g. (° C.)·18 g./mol
$L$=540 cal./g.·18 g./mol

Hence $X^b=17^{0.2445}=2.00$
$a=\alpha^b=1.029^{0.2445}=1.007$

Substituting these values into expression (7)

$$\text{Thermal cost}=\frac{0.482\times 18}{540\times 18}\cdot 374\frac{2(1.007-1)}{2-1.007}$$

$$=0.00467$$

Hence, operating under these conditions, the heat required to obtain fresh water from sea water by means of this cycle is only 0.00467 of the heat required to produce it by simple distillation.

An examination of expression (7) shows that the thermal cost diminishes with increasing $P_2/P_1$. Hence, operating on a cycle where $P_2/P_1$ is less than 17 will result in a thermal cost correspondingly greater than 0.00467, and operating on a cycle with $P_2/P_1$ greater than 17 will result in a thermal cost even lower than 0.00467. In actual equipment design, the value selected for $P_2/P_1$ will represent an optimum balance between equipment costs, the unit price for heat, and the thermal cost as defined above.

It is of interest to note the temperatures encountered throughout the cycle in the above case where $P_2/P_1$=17:

$T_1$=374° K. (213° F.)
$T_2$=2×374° K.=748° K. (887° F.)

$$T_3=748°\text{ K.}+374\times 2\times\frac{.007}{.997}=(748+5.2)°\text{ (896° F.)}$$

$T_4$=(374+5.2)° K. (223° F.).

Hence the steam, from the time it is produced from sea water in the boiler, at 100.8° C., until the time it enters the condenser tubes in the boiler, is superheated; the degree of superheat of the steam entering the condenser tubes, $T_4-T_3$=5.2° C.

A more precise analysis can be made for vapors for which an entropy-enthalpy (Mollier) diagram is available, as is the case for steam. With this, no assumption as to gas ideality is used, and the actual departures from ideality are taken into account. Reexamination of the above example, where the boiler operates at 100.8° C., the compressor inlet pressure is 1 atmosphere, and the compressor discharge pressure is 17 atm. (250 p.s.i.a.), gives a compressor discharge temperature $T_2$=850° F., and a turbine inlet temperature $T_3$=863° F. The slightly lower temperatures for $T_2$ and $T_3$ in the real case can be regarded as arising from the fact that the heat capacity of steam does not remain constant but increases slowly with increasing temperature. The thermal cost derived using real gas data is not changed significantly from that calculated using the assumption of gas ideality.

In an actual system, frictional dissipation of energy will result in actual thermal costs somewhat above the values calculated either from expression (7) or from an entropy-enthalpy diagram, and the calculated value may be approached but never actually attained in practice.

As a numerical example of the practical value of this invention, consider the case where heat has a basic cost of $0.30 per million B.t.u. Then the cost of the heat required to produce 1000 gal. of fresh water from saline water by simple distillation is approximately $2.30, an unacceptably high cost for the majority of applications. However, using the example of this invention given above, at the parameters used in the sample calculation, the cost of the heat required to produce 1000 gal. will be $2.30× .00467=$0.011, or slightly more than one cent per thousand gallons.

The foregoing, of course, does not take into consideration compressor or turbine efficiencies, nor does it make any allowance for operating overhead costs inherent in a practical installation. However, present indications are that on a conservative basis and allowing for all of these factors, the cost of producing distilled water using the invention, and more particularly one of the modified forms, presently to be described, of the basic system described above, results in at least halving present minimum costs per unit volume. The system accordingly offers a very substantial advantage over the more conventional distillation systems heretofore proposed.

Referring again to FIG. 1, the steam produced in the boiler tubes passes upward through a vaned stator 24, which imparts a rotary motion to the emerging steam, tending to force entrained droplets to the periphery of the boiler head. The steam entering the axial steam discharge port 26a is thus substantially freed of entrained droplets. It is important to remove most of the entrained droplets, since they are not pure water and their inclusion in the steam may result in contamination of the distillate and the formation of deposits in the heater. Moreover, exposure of the compressor and turbine blades to steam having substantial amounts of entrained droplets may result in excessive erosion of the blades. Conventional steam separators may also be used to remove entrained droplets.

In order to assure a satisfactorily high steam quality (steam quality is herein defined as the ratio of the weight of steam to the total weight of steam plus water), it may be desirable to preheat the compressor inlet steam. Low grade heat (i.e., heat at a relatively low temperature) for this purpose may be obtained from the turbine outlet steam, or, in the case where fossil fuel is used as the primary heat source, from the combustion products emerging from the heater. It is important, however, to minimize the compressor steam preheat, since it increases the amount of mechanical work required for compression and thus has an adverse effect on the thermodynamics of the cycle.

Although not essential to the operation of this invention, the use of additional heat exchangers may be important for its most economical operation. In the case where the externally-supplied heat is produced in an open cycle arrangement, as by combustion of fossil fuel, extensive use of heat exchangers is necessary to extract most of the useful heat from the combustion products.

Similarly, optimum use of this invention requires the use of boilers having a small temperature drop across the heat transfer surface, such as the type known as long-tube vertical evaporators.

In some cases it will be advantageous to use a closed-cycle system in respect to the steam passing through the compressor-heater-turbine unit, rather than the open-cycle system described above and illustrated in FIG. 1. This will be the case, for example, where the feed water contains a solute so corrosive at elevated temperatures that entrainment of even very small quantities of liquid as droplets in the steam will result in compressor or turbine blade corrosion.

In the closed-cycle, the working fluid passing through the compressor-heater-turbine does not become the product distillate. This is shown in FIG. 2, wherein the steam or other working fluid emerging from the turbine passes into heat exchanger 18 of lower boiler 10, where it condenses. It is then passed through duct 40 to pump 46 which delivers it to a second boiler 110 as feed water. Concurrently, saline water is introduced into lower boiler 10 as feed, and the steam produced from the saline water in the lower boiler is passed into heat exchanger 118 of upper boiler 110, where it condenses as the product distillate, at the same time producing steam from the upper boiler feed water. The steam so produced in the upper boiler then passes by duct 126 into the compressor to continue the closed cycle. Since the steam which passes through the compressor-heater-turbine is recycled continuously and is not produced directly from saline or impure water, it may be maintained at an extremely high purity level.

In the closed-cycle system, the two-boiler arrangement shown in FIG. 2 can be replaced by a single compound boiler which accomplishes the same result.

In the closed-cycle system, it is less important to remove entrained droplets from the vapor emerging from the boiler, since they do not contain any solute. The more liquid phase water passing into the compressor, the less work it must do per pound for a given compression ratio, and for this reason it may be desirable deliberately to entrain droplets in some designs. This will be the case particularly in units designed to produce more work at the turbine than is consumed by the compressor, so that some useful mechanical work is performed external to the compressor-heater-turbine in the distillation process. This is discussed further below.

In another example of this invention, a series of three boilers is operated with the boilers in tandem from a single compressor-heater-turbine unit as shown in FIG. 3. The steam produced from saline water in the first boiler 10 passes into heat exchanger 118 of a second boiler 110, producing a like amount of steam. This then passes into a third boiler 210, and the steam produced there passes back to the compressor-heater-turbine unit, as before. With this arrangement, the first boiler must operate at a higher pressure than the second, and the second at a higher pressure than the third. This means that the compressor-to-turbine discharge pressure ratio must be greater than that required to operate a single boiler, and it can be shown that the overall pressure ratio required to operate three boilers in tandem is approximately the product of the pressure ratios required to operate each boiler singly. Hence, there is no simple thermodynamic advantage because a correspondingly greater heat input is required at the heat exchanger to attain the necessary pressure ratio. A significant advantage of tandem boiler operation lies, rather, in the ability to have a large and consequently more efficient compressor-heater-turbine unit operate a number of boiler units. Another advantage is that it may be used for double or triple distillation to achieve extremely high purity distillate. This is achieved in the illustrated system where the distillate produced in one boiler is used as feed for a second boiler, and so on.

In principle, any number of boilers may be operated in tandem, although in practice the optimum number will be relatively small, probably not more than six in most situations.

In the examples of this invention described above, all of the work received by the turbine is used to drive the compressor, so that the net work done external to the distillation system is zero. In some cases it will be useful to use less work in the compressor stage than is produced at the turbine, and this mechanical work may be used externally to drive an electrical generator, for example. The relationships between the heat input, the net work, and the amount of distillate are governed by the same thermodynamic principles as govern the zero net work case analyzed above. The arrangement in this case is essentially similar to that shown for the turbo-compressor portion of FIG. 1 except that motor 44 in this latter case becomes a generator.

A particularly important case here is that in which an installation is needed to produce moderate amounts of power and large amounts of distilled water. Having selected the ratio between the electrical power output and the rate at which water is to be distilled, the other parameters governing the system are readily derived, in a fashion analogous to that by which expression (7) was derived. When external mechanical work is performed, the thermal cost, still defined as the ratio of the heat required to produce a unit quantity of distillate to the heat required for simple distillation, must increase. However, where the power/water ratio is small, the increase in the thermal cost is also small.

It is also possible to use this system on a negative net work cycle, i.e., to have the turbine produce less work than is required to drive the compressor, and supply the additional work from outside the system. With such a cycle, the thermal cost is reduced below that given by expression (7), for now both mechanical and thermal energy are being supplied to the system. A negative net work cycle is of use primarily in situations where low-cost mechanical energy is available, or where the cost of heat is high.

In another example of this invention, two compressors are employed, both driven by the same turbine. This is illustrated in FIG. 4. A first compressor 48 has a low compression ratio and serves to compress the vapor to a pressure sufficiently above the saturation pressure so that it will condense in the boiler heat exchanger 18, and a portion of this vapor is accordingly then returned by duct 38a directly to the boiler heat exchanger. The balance of the vapor, which will ordinarily be a minor fraction thereof, is then passed to the second compressor 12, which compresses it to a much higher pressure, after which it is heated in the heat exchanger 14, expanded in the turbine 16, and then also returned by duct 38 to the boiler heat exchanger together with the vapor returned through duct 38a. The advantage of the two-compressor cycle is that it avoids much of the energy degradation resulting from compressor and turbine inefficiencies for that portion of the vapor which only passes through the one compressor.

Figure 6:
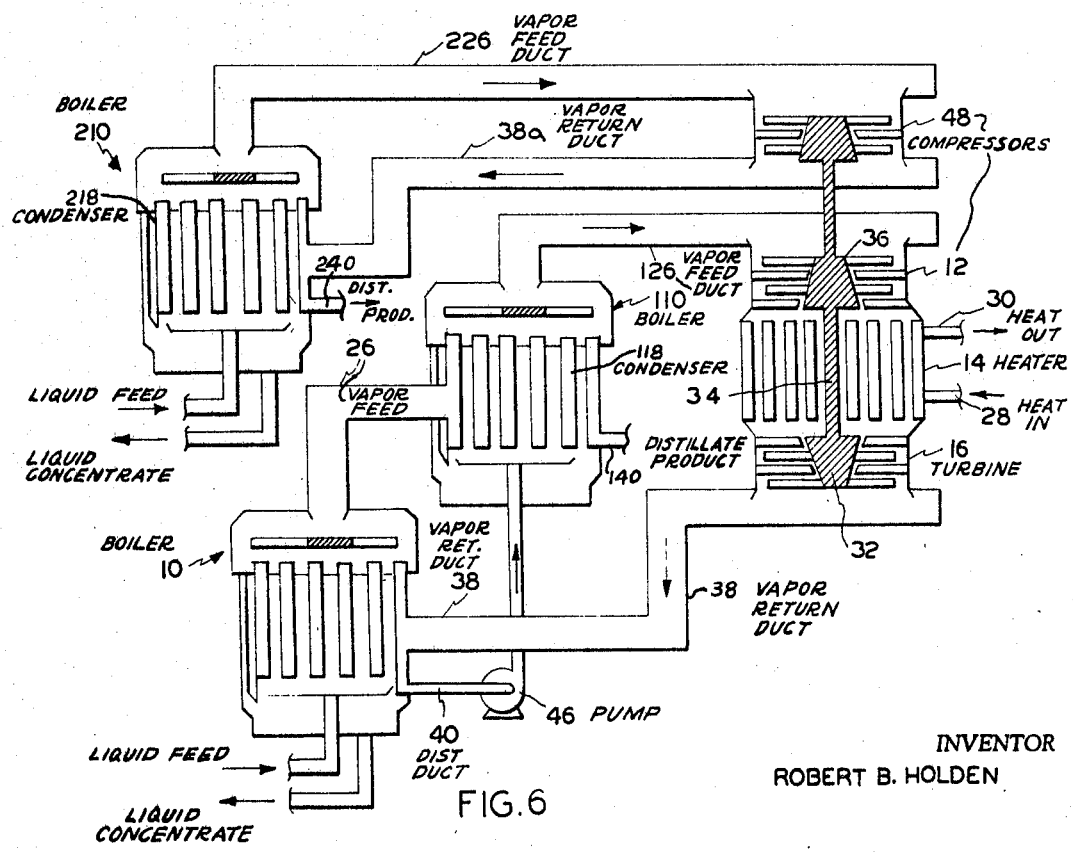
FIG. 6 is an other form of two-compressor system in which one compressor is positioned in an independent boiler circuit, with a second compressor, two-tandem boiler and turbine operating in a closed loop.
Figure 5:
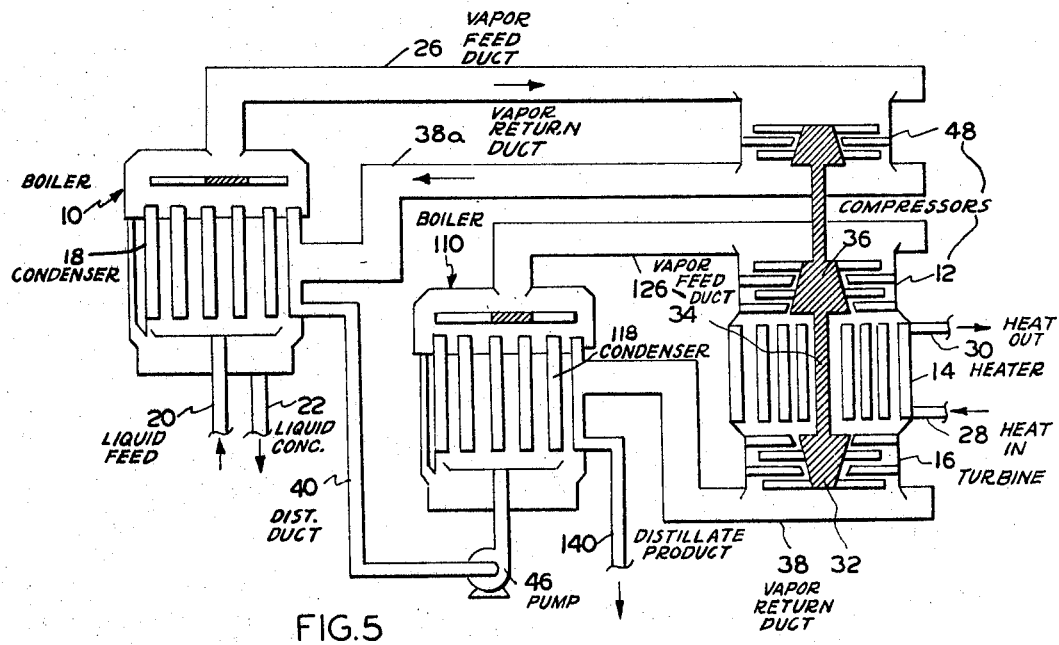
FIG. 5 is still another modification, similar to the two-compressor arrangement of FIG. 4 but using two boilers in tandem and separate vapor paths for each compressor.

In a variation of the two-compressor cycle, just described, all of the vapor passing through the first compressor 48 is returned directly to the boiler heat exchanger 18, and the vapor passing through the second compressor 12, the heat exchanger 14, and the turbine 16 constitutes a second loop, which may be open or closed. The open-loop system is shown in FIG. 5, and the closed-loop system in FIG. 6. In the latter system a third boiler 210 is necessary.

Figure 7:
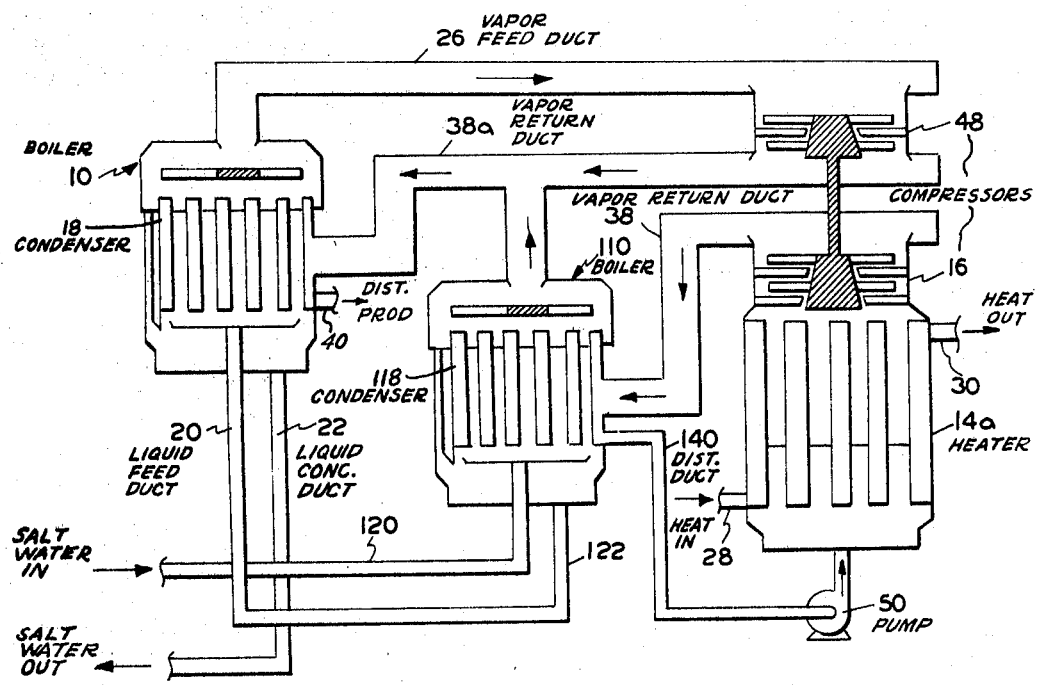
FIG. 7 illustrates a further modification of the system shown in FIG. 4 wherein the second compressor is omitted and is replaced by a pump operating in conjunction with a condenser.

In another example, a two-compressor cycle is used in which all of the vapor from the boiler passing through the first compressor is returned to the first boiler heat exchanger and a second closed-loop is provided in which the usual compressor (e.g., compressor 12) is replaced by boiler 110 (acting in this case as a condenser) and pump 50. The primary boiler feed here is used as condenser coolant for effecting condensation in boiler 110. In this modification, which is illustrated in FIG. 7, the second compressor is actually pump 50 compressing liquid, and, since its specific volume is low in comparison with vapor, the compressive work required is correspondingly minimized, so that most of the work produced by turbine 16 is available to drive the first compressor. Heat exchanger 14a in this example is simply another boiler having a heat input duct 28 and an outlet 30. Such a boiler preferably includes a superheat section.

The two-compressor cycle may also be combined with

What is claimed is:

1. A thermomechanical system for distilling liquids, said system comprising boiler, compressor, heater and expander means, and vapor duct means interconnecting these units in series flow in the order named for the flow therethrough of vapor produced in said boiler; said boiler having a condenser section incorporated therein and means for delivering a liquid to be distilled to said boiler and into heat exchanging contact with said condenser section thereof; means connected to the expander outlet for passing the expanded vapor to said boiler condenser section; means to recover condensate from said boiler condenser section, and means to remove liquid concentrate from said boiler; means for supplying heat to said heater means; and driving means connecting said expander to said compressor means, said boiler means comprising a series of boiler units each incorporating a condenser section; said means connected to said expander outlet passing expanded vapor to the condenser section of a first of said boilers, other means passing the vapor produced in said first boiler to the condenser section of a second boiler in the series, and similar means passing the vapors from each additional boiler in series to the condenser section of the next until the last in the series of boilers is reached; said duct means passing the vapors to the intake of said compressor being connected to the last of the boilers in the series; means to recover condensate from each of said boiler condenser sections, means to deliver liquid to be distilled to each of said boilers, and means to remove liquid concentrate from each of said boilers.

2. The system defined in claim 1, wherein said expander is a gas turbine.

3. A thermomechanical system for distilling liquids comprising, in combination
  (a) a boiler, means for supplying a liquid to be distilled to said boiler, a condenser section in said boiler, a first compressor and duct means connecting said boiler to said first compressor to supply vapor thereto;
  (b) a second compressor, an external heat exchanger having means for connection to an external source of heat, an expander and duct means connecting said second compressor, external heat exchanger and said expander in series for the flow therethrough of vapor exhausting from said first compressor; duct means connecting the expander outlet to said boiler condenser section and other duct means tapped into system between said first and second compressors to provide a bypass leading back to said boiler condensing section; means to recover condensate from said boiler condenser section and means to remove liquid concentrate from said boiler;
  (c) said expander being operatively connected to and driving both said first and second compressors.

4. The system as defined in claim 3, wherein the expander is a gas turbine.

5. A thermomechanical system for distilling liquids comprising in combination
  (a) a first circuit including first boiler means, means for supplying a liquid to be distilled thereto, means for removing liquid concentrate therefrom, and a condenser section in said boiler, a first compressor and vapor duct means connecting said boiler means to said compressor and said compressor to said condenser section in series flow;
  (b) a second circuit including second boiler means, means for supplying a liquid to be distilled therein, means for removing liquid concentrate therefrom, and a condenser section in said second boiler, a second compressor, an external heat exchanger and means for supplying heat thereto from an external source, an expander and vapor duct means connecting said second boiler means, said second compressor, external heat exchanger and expander means in series for vapor flow therethrough, vapor duct means connecting the outlet of said expander to the condenser of said second boiler and means for removing condensate from said second condenser;
  (c) said expander being operatively connected to and mechanically driving both said first and second compressors.

6. A thermomechanical system as defined in claim 5, wherein said expander is a gas turbine.

7. A thermomechanical system as defined in claim 6, wherein means is provided for conducting the condensate produced in the condenser of said first boiler to the second boiler as the feed for said second boiler.

8. A thermomechanical sysem as defined in claim 6 wherein said second boiler means comprises two boilers consisting of primary and secondary units each having a condenser section incorporated therein, means for supplying liquid to be distilled in and means for removing liquid concentrate from said boiler, duct means connected between the primary boiler unit and the condenser of the secondary unit to pass vapor from said primary unit to the condenser of said secondary unit; other duct means connected to said secondary boiler unit leading to the input of said second compressor; said vapor duct means at the outlet of said expander leading back to the condenser of said primary boiler unit and the condensate duct means of said primary unit being connected to the means for supplying liquid to be distilled in said second boiler unit.

9. A thermomechanical system for distilling liquids comprising in combination
  (a) means for supplying a liquid to be distilled;
  (b) a first boiler and a condenser section disposed therein, a first compressor and vapor duct means connecting said boiler to said compressor inlet and said compressor outlet to said first boiler condenser section;
  (c) means for feeding said first boiler with a supply of liquid to be distilled, and duct means leading from said first boiler condenser section for removing distilled condensed liquid therefrom, and other duct means for removing liquid concentrate from said first boiler;
  (d) a second boiler, a turbine, condenser means external to said second boiler, and vapor duct means connecting the boiler to said turbine and said turbine to said external condenser for condensation therein of the vapor;
  (e) a pump, and condensate duct means connecting said pump between said external condenser and said second boiler to deliver condensate to said second boiler under pressure, and means for driving said pump;
  (f) driving means operatively connecting said compressor to said turbine; and
  (g) duct means for supplying a cooling liquid to the coolant side of said external condenser and for removing the cooling liquid from said external condenser.

10. A thermomechanical system as defined in claim 9, wherein the duct means for supplying the cooling liquid to said external condenser is connected to said means for supplying the liquid to be distilled in the system, and duct means is provided connecting said condenser to said first boiler to deliver coolant liquid exiting from said condenser to said boiler for evaporation therein.

11. A thermomechanical system as defined in claim 10, which further includes duct means venting the coolant side of said external condenser to the vapor return side of said condenser section in said first boiler.

(References on following page)